L. LANGHAAR.
ANTIFRICTION BEARING.
APPLICATION FILED DEC. 20, 1911.
1,199,577.
Patented Sept. 26, 1916.
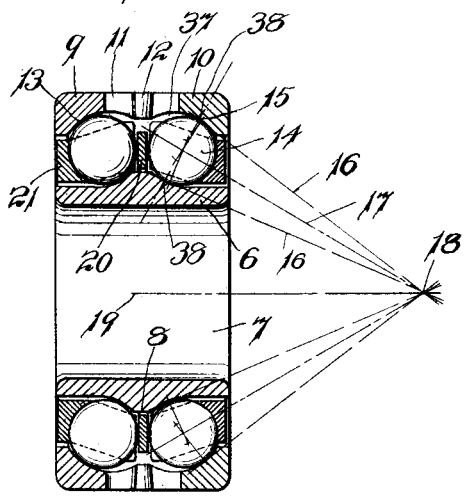
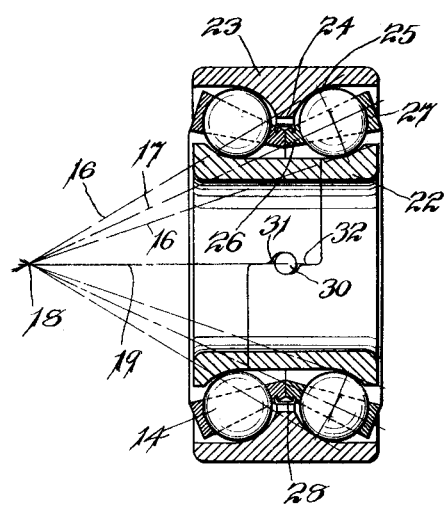
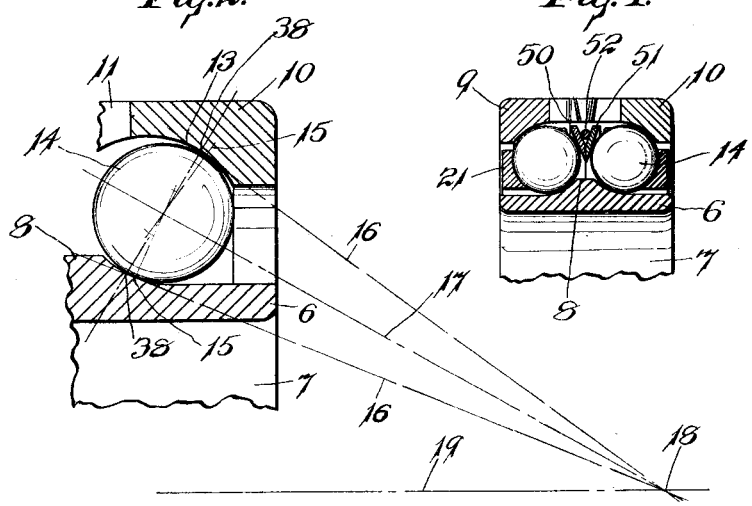
WITNESSES:
Louis Lucia
E. L. Stoughton
INVENTOR.
Louis Langhaar.
BY
Arthur B. Jenkins,
ATTORNEY.

UNITED STATES PATENT OFFICE.

LOUIS LANGHAAR, OF WEST HARTFORD, CONNECTICUT.

ANTIFRICTION-BEARING.

1,199,577.  Specification of Letters Patent.  Patented Sept. 26, 1916.

Application filed December 20, 1911. Serial No. 666,902.

*To all whom it may concern:*

Be it known that I, LOUIS LANGHAAR, a citizen of the United States, and a resident of West Hartford, in the county of Hartford and State of Connecticut, have invented a new Improvement in Antifriction-Bearings, of which the following is a specification.

My invention relates generally to the class of anti-friction bearings and more especially to that class of such bearings known as two-point ball bearings, and an object of my invention, among others, is to provide a bearing of this type in which the friction between its movable members shall be reduced to a minimum.

One form of device embodying my invention and in the construction and use of which the object above set out, as well as others, may be attained, is illustrated in the accompanying drawings, in which—

Figure 1 is a view in section through a bearing illustrating my invention. Fig. 2 is a detail view on enlarged scale of a portion of a bearing illustrating my invention. Fig. 3 is a view of a bearing showing a slightly different form of restraining member. Fig. 4 is a view of a portion of a bearing showing still another form of constraining member.

In the accompanying drawings the numeral 6 denotes the inner or cone member of a bearing having a central opening 7 and a ridge 8 forming a double cone. The outer member or case is preferably composed of two parts, 9—10, secured together in any convenient manner, the case being thus made for assembling purposes. The invention, however, is not limited to such construction as it is not absolutely essential that the case or the cone member shall be made in sections, as any other well-known construction which will enable the parts to be assembled may be made use of without affecting the invention. The parts 9, 10 ove lap one another, the overlapped portions having at their meeting faces recesses, together forming oblong holes 11 in which tapered pins 12 are inserted for the purpose of holding the parts together, there being any suitable number of holes 11 and pins 12 to effectively accomplish the purpose. The casing has two grooves 13 each located opposite a depression on one side of the ridge 8 on the cone 7 and together therewith forming the raceways for balls 14.

The bearing thus far generally described is of old and well-known construction, and except in combination with other parts to be hereinafter described forms no part of my present invention, and further and detailed description will therefore be omitted.

The type of two-point ball bearings to which this invention especially relates is distinguished by the fact that each ball has but two points of contact with the bearing members. All materials known as solids are either plastic or elastic, and often combine both of these properties in varying degrees. However, the solids suffer deformation at the point of pressure under any assignable load. It is a well-known and long accepted fact that the balls in a bearing do not carry the load on a true mathematical point but on a well defined area of contact. This latter fact accounts largely for the resistance known as rolling friction. In bearings of the two-point, radial contact, annular type the rolling friction is at the minimum possible limit when such bearings are used under purely radial load, but under the least thrust component the sliding friction is considerably augmented. The thrust bearings of many types are seriously affected by an excessive amount of friction due to the violation of the strict laws of pure rolling. It is well-known that when two bodies roll together, having their axes relatively inclined to each other, that in order to obtain the least amount of friction the axes of the bodies prolonged meet at a point, and all' contacting elements of the rolling surface should be elements of cones having a common apex at the intersection of the axes. The slipping effect of balls in thrust bearings of present types is found to seriously affect the durability of balls and raceways, necessitating the employment of relatively lighter loads and lower speeds than is permissible with two-point, radial contact, annular bearings under radial load. My present invention seeks to secure, to as great a degree as possible, the same pure rolling effect in two-point contact thrust bearings as is obtained in two-point contact radial bearings under radial load, such a result being possible with the device herein illustrated.

In thrust bearings embodying rollers in their construction the axes of the rollers are inclined to meet at a common point and the rolling surfaces disposed in the form of a cone, as hereinbefore mentioned, the circumference of the larger end of the roller being in the same proportion to the longer path which it travels in its revolution as is the circumference of the smaller end to its shorter path, that is, the two ends are so proportioned that when the roller has made a complete rotation on its axis each end will have traveled exactly the same portion of the distance of its path around the bearing member, as the cone, and this without slipping at either end of the bearing. It is my purpose with the present invention to secure this same result with ball bearings and in order to do this the bearing portions in the cones and case are so arranged that the balls will have their bearings, under a certain assignable load, at the points 15, the tangents of the balls when rotating on their axes 17 on these paths developing the conical surfaces 16 meeting at the common point 18 on the axis 19 of revolution of the balls or rotation of the outer and inner bearing members. The balls traveling on these paths will provide a thrust ball bearing of the annular type approaching as near as possible the laws of pure rolling. It will be observed, however, that the balls will not under ordinary laws be maintained on these paths of points of contact 15, but will naturally be forced away from the point 18 on the line 17 into the flaring enlarged part 37 of the race until they come to rest on the bearing points 38.

The word "race" or "ball race" as used in this application indicates the track for the balls on either the inner or outer member of the bearing, while the word "raceway" indicates space for the balls included between a pair of coöperating races.

It will be noted that the raceway flares from the points 15, and the line 17 passing midway between the points 15 will in the travel of the balls generate the outer surface of a cone with its apex in the axis 19 of revolution of the balls, and I have, therefore, termed such line in the claims herein as the central line of flare of the raceway. Applicant knows curved raceways to be old in the art, and balls having a single place of contact with each race to be old in the art. In all such constructions as heretofore made the diameter of the balls is equal to the maximum width of flare between the opposed races, the races themselves acting as the sole means to resist all movements of the balls laterally and radially, and the tangents to said races at the places of contact being of necessity parallel.

I therefore introduce a member to restrain the ball from such movement last mentioned and cause it to maintain its travel on the paths 15. This restraining member may be provided in different forms, one of such forms being shown in Fig. 1. in which an annulus 20 is provided extending around the member 6 and located between the two rows of balls, so that the balls in each row will be forced against this restraining member. The method of supporting this annulus or restraining member 20 must be such as not to introduce the very friction it is sought to avoid, and to this end this restraining member is so supported that it may have a rate of travel different from that of the balls while the latter revolves about the axis 19, said member thus rolling on the surface of the balls and thereby having a certain speed relative to the surface of the balls. The above description refers specifically to the row of balls on the right hand side of Fig. 1 but it will be understood that the description applies equally to the row of balls at the left hand side of said figure, with the exception that each ball of the latter row is forced in an opposite direction, the balls in each row in fact being forced toward each other. The included angle between the tangents at the points 15 is comparatively small in most cases so that there will be only a slight pressure ordinarily between the ball and the restraining member 20. Suitable separators 21 may be employed for spacing the balls from each other.

Another form of device embodying the invention is shown in Fig. 3 in which the outer member 23 has the rib 24 providing the raceway for the balls. The arrangement of the bearing paths, however, is the same as above described with respect to Fig. 1 except that the thrust tends to force the balls along the line 17 in an opposite direction from the common meeting point 18 of the imaginary conical surface 16, the arrangement in fact being substantially a reversal of the construction shown in Fig. 1, the balls in each row being forced away from each other instead of toward each other as in Fig. 1. The inner member 22 is separated in this construction, a pin 30 being located in the recesses 31 on the meeting faces 32 of the two members, this joint for the two members being the same as that described with respect to the casing of Fig. 1. In this construction shown in Fig. 3 another means for retaining the balls on their paths 25 of travel is employed, the restraining member 27 having bearing against each of the balls on its axis of rotation so that there is but very little friction caused by the restraining member. This restraining member may be provided in many different ways, as shown herein it forms a part of a sectional separator 26, the two sections of which rest against each other and are held by a tie 28, the two sections of the separator being permitted independent travel and thus accommodating themselves to the slight difference in speed which cannot be avoided between the two rows of balls. Fig. 3 may be referred to for a clear understanding, if required, of the construction of the joint between the two parts of the sectional member, although, as hereinabove stated, this construction is immaterial.

In the form of device shown in Fig. 4 and involving my invention a separate constraining member is provided for each set of balls, the other parts of the bearing being as shown and described with respect to the device illustrated in Fig. 1. In this device shown in Fig. 4 the two constraining members 50, 51 are applied on the axis of rotation of each of the balls and preferably abutting at their inner edges. A resilient member 52, in this instance a split spring ring acting under compression, is placed between the two constraining members and acts as a yielding force to hold them in place.

The form of device herein shown may be changed to a greater or lesser extent and yet embody the invention, and I do not therefore limit my invention to a device made in exact accordance with that shown herein, as any structure in which the forcible constrainment of the balls in a two-point, contact, thrust bearing is such as to give substantially pure rolling contact will be deemed to be within the spirit and intent of the invention.

I claim—

1. A ball bearing to receive some degree of thrust and including two opposed members each having a race-way curved laterally to the direction of travel of balls thereon and of a greater radius than that of said balls, rows of balls, each ball having substantially a point bearing on said race-ways, and a constraining member having free rotative movement between the rows of balls and having flat bearing surfaces forming substantially point contacts with the balls in said rows and holding the balls on paths of travel on said curved raceways, the tangents to which at the points of contact of said balls meet at a point in the axis of revolution of said balls about the axis of the bearing.

2. A ball bearing including two opposed members having a laterally curved raceway for a row of balls between them, a row of balls located in said raceway, said raceway and balls being formed to permit lateral movement of the balls within the raceway and means for yieldingly restraining the balls from lateral movement from their points of contact with said bearing members.

3. A ball bearing including two opposed members having a laterally curved raceway for a row of balls between them, a row of balls located in said raceway, each ball having contact with both bearing members, the tangents at said points meeting at a common point in the axis of the shaft and generating conical surfaces, and means for yieldingly restraining the movement of the balls from said points of contact.

4. A ball bearing including two opposed members having a plural number of raceways for rows of balls between them, a row of balls located in each of said raceways, each ball having contact with both members at points at one side of a diametrical plane through the balls, means for restraining the movement of the balls in each of the raceways from said points of contact, and means for exerting a yielding pressure upon said restraining member.

5. A ball bearing including two opposed members having a plural number of raceways for rows of balls between them, a row of balls located in each of said raceways, each ball having contact with both members at points on one side of a diametrical plane through the balls, means for restraining the movement of the balls in each of the raceways from said point of contact, said means including two members abutting against each other, and means for exerting a yielding pressure upon said restraining means.

6. An anti-friction bearing comprising plural sets of raceways, plural sets of anti-friction members disposed therein, a composite annular member disposed between the adjacent rows of anti-friction members and adapted for rolling contact therewith, and means for pressing said annular member into resilient contact with the sides of the anti-friction members.

LOUIS LANGHAAR.

Witnesses:
ARTHUR B. JENKINS,
EVA L. STOUGHTON.